US011635821B2

United States Patent
Park et al.

(10) Patent No.: US 11,635,821 B2
(45) Date of Patent: Apr. 25, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Joonah Park, Suwon-si (KR); Jaeyong Ju, Suwon-si (KR); Taehyeong Kim, Suwon-si (KR); Jaeha Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/081,597

(22) Filed: Oct. 27, 2020

(65) Prior Publication Data

US 2021/0149498 A1  May 20, 2021

(30) Foreign Application Priority Data

Nov. 20, 2019  (KR) .......................... 10-2019-0149440

(51) Int. Cl.
*G06F 3/01* (2006.01)
*G06V 40/20* (2022.01)
(Continued)

(52) U.S. Cl.
CPC .............. *G06F 3/017* (2013.01); *G06F 3/005* (2013.01); *G06F 3/012* (2013.01); *G06F 3/013* (2013.01); *G06F 3/0304* (2013.01); *G06V 40/19* (2022.01); *G06V 40/20* (2022.01); *G06V 40/23* (2022.01); *G06F 2203/011* (2013.01)

(58) Field of Classification Search
CPC .......... G06F 3/017; G06F 3/012; G06F 3/013; G06F 3/0304; G06F 3/005; G06F 2203/011; G06K 9/00342
See application file for complete search history.

(56) References Cited

U.S. PATENT DOCUMENTS 6,788,809 B1    9/2004  Grzeszczuk et al.
8,325,214 B2 *  12/2012  Hildreth ................ G06F 3/0304
                                                  348/14.03
(Continued)

FOREIGN PATENT DOCUMENTS

JP    2011232894 A    11/2011
JP      5323770 B2    10/2013
(Continued)

*Primary Examiner* — Mihir K Rayan
(74) *Attorney, Agent, or Firm* — Sughrue Mion, PLLC

(57) ABSTRACT

An electronic apparatus is provided. The electronic apparatus includes a camera; a memory configured to store at least one instruction; and at least one processor configured to execute the at least one instruction to: detect at least one object included in an image captured by the camera; identify information on an engagement of each of the at least one object with the electronic apparatus; obtain gesture information of each of the at least one object; obtain a target object from among the at least one object based on an operation status of the electronic apparatus, the information on the engagement of each of the at least one object, and the obtained gesture information of each of the at least one object; identify a function corresponding to gesture information of the target object; and execute the identified function.

16 Claims, 10 Drawing Sheets

(51) Int. Cl.
*G06F 3/00* (2006.01)
*G06F 3/03* (2006.01)
*G06V 40/19* (2022.01)

(56) References Cited

U.S. PATENT DOCUMENTS

| | | |
|---|---|---|
| 10,120,454 B2 | 11/2018 | Steinberg et al. |
| 2003/0095154 A1* | 5/2003 | Colmenarez ............ G06F 3/017 715/863 |
| 2009/0022368 A1* | 1/2009 | Matsuoka ............... G06F 3/013 382/103 |
| 2009/0273687 A1* | 11/2009 | Tsukizawa ................ G06T 7/74 348/222.1 |
| 2011/0262006 A1 | 10/2011 | Nakano |
| 2011/0298722 A1* | 12/2011 | Tse ........................... G06F 3/041 345/173 |
| 2012/0124516 A1* | 5/2012 | Friedman ................ G06F 3/017 715/810 |
| 2012/0257035 A1* | 10/2012 | Larsen .................... G06F 3/017 348/78 |
| 2012/0268372 A1* | 10/2012 | Park ....................... G06F 3/0304 345/158 |
| 2012/0295708 A1* | 11/2012 | Hernandez-Abrego ..................... A63F 13/213 463/36 |
| 2013/0120243 A1* | 5/2013 | Kim ..................... G06V 40/172 345/156 |
| 2015/0234460 A1* | 8/2015 | Irie ........................ G06F 3/013 345/156 |
| 2016/0195926 A1* | 7/2016 | Imoto .................... G06F 3/012 382/103 |
| 2017/0293363 A1* | 10/2017 | McLaughlin ........... G06F 3/017 |
| 2021/0149496 A1* | 5/2021 | Sen .......................... G06T 7/20 |

FOREIGN PATENT DOCUMENTS

| | | |
|---|---|---|
| JP | 5793900 B2 | 10/2015 |
| KR | 1020150096319 A | 8/2015 |

* cited by examiner

FIG. 6

| OPERATION STATUS OF ELECTRONIC APPARATUS | | GESTURE TYPE OF OBJECT | WHETHER OBJECT IS ENGAGED | WHETHER FUNCTION IS EXECUTED |
|---|---|---|---|---|
| FIRST OPERATION STATUS | | FIRST GESTURE TYPE | Y | Y |
| | | SECOND GESTURE TYPE THIRD GESTURE TYPE FOURTH GESTURE TYPE | Y | N |
| SECOND OPERATION STATUS | USER COMMAND STATUS | FIRST GESTURE TYPE | Y | Y |
| | | SECOND GESTURE TYPE | N | Y |
| | | THIRD GESTURE TYPE FOURTH GESTURE TYPE | Y | Y |
| | ACTIVE TRIGGER STATUS | FIRST GESTURE TYPE | Y | Y |
| | | SECOND GESTURE TYPE | Y | Y |
| | | | N | Y |
| | | THIRD GESTURE TYPE FOURTH GESTURE TYPE | Y | N |
| THIRD OPERATION STATUS | | ALL GESTURE TYPES | - | N |

ELECTRONIC APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2019-0149440 filed on Nov. 20, 2019, in the Korean Intellectual Property Office, the disclosure of which is incorporated by reference herein in its entirety.

BACKGROUND

1. Field

The disclosure relates to an electronic apparatus and a controlling method thereof and more particularly, to an electronic apparatus that provides a function corresponding to a user gesture based on an operation status of the electronic apparatus, a user's engagement regarding the electronic apparatus, and user gesture information, and a controlling method thereof.

2. Description of Related Art

With the development of electronic technology, gesture recognition technology has been applied to various industries. Recently, gesture recognition technology has been applied to various electronic devices and applications so that, for example, a user may manipulate a smart phone or a tablet PC through a gesture.

An electronic apparatus where related art gesture technology is applied operates such that while maintaining an interaction with a first user by recognizing a gesture of the first user and executing a function corresponding to the intention of the first user, if a gesture of a second user is recognized, the electronic apparatus may stop the interaction with the first user while the interaction of the first user is not completed and execute a function corresponding to the gesture of the second user. In this case, even though the second user does not intend to execute a function of the electronic apparatus, the electronic apparatus may recognize the gesture of the second user as a command gesture for executing a specific function and thus, execute a function that is not intend by the user.

When recognizing a gesture and executing a function in an environment where there is a plurality of users, there may be problem that a function is executed regardless of the intention of a user, or a user's gesture is misrecognized and a wrong function is executed, thus deteriorating the convenience and satisfaction of the user who manipulates an electronic apparatus using a gesture.

Therefore, there is a need for natural interaction technology capable of accurately identifying a user's intention for manipulating an electronic apparatus and executing a function corresponding to the user's intention.

SUMMARY

Provided is an electronic apparatus capable of performing a natural interaction with a user by executing a function corresponding to the user's intention.

Additional aspects will be set forth in part in the description which follows and, in part, will be apparent from the description, or may be learned by practice of the presented embodiments.

In accordance with an aspect of the disclosure, an electronic apparatus includes: a camera; a memory configured to store at least one instruction; and at least one processor configured to execute the at least one instruction to: detect at least one object included in an image captured by the camera; identify information on an engagement of each of the at least one object with the electronic apparatus; obtain gesture information of each of the at least one object; obtain a target object from among the at least one object based on an operation status of the electronic apparatus, the information on the engagement of each of the at least one object, and the obtained gesture information of each of the at least one object; identify a function corresponding to gesture information of the target object; and execute the identified function.

The processor may be further configured to execute the at least one to identify the information on the engagement of each of the at least one object based on at least one of a distance from the electronic apparatus to each of the at least one object, an angle at which each of the at least one object gazes at the electronic apparatus, a time at which each of the at least one object gazes at the electronic apparatus, and direction information regarding a body and head of each of the at least one object.

The processor may be further configured to execute the at least one instruction to: obtain gesture information of each of the at least one object based on an image obtained during a plurality of frames; obtain an average value and a variance value of the angle at which each of the at least one object, obtained during the plurality of frames, gazes at the electronic apparatus; and identify the information on the engagement of each of the at least one object based on the average value and the variance value.

The processor may be further configured execute the at least one instruction to: obtain candidate objects having an engagement greater than a predetermined engagement from among the at least one object; and identify, from among the candidate objects, a candidate object making a gesture corresponding to a predetermined gesture as the target object.

The processor may be further configured execute the at least one instruction to: obtain candidate objects having an engagement greater than a predetermined engagement from the at least one object; and identify, from among the candidate objects, a candidate object at a shortest distance from the electronic apparatus as the target object.

An operation status of the electronic apparatus may include a first operation status in which an input of a wake-up gesture is awaited, a second operation status in which interaction with an object is performed, and a third operation status in which interaction with an object is blocked, wherein the memory is configured to store information indicating whether a function corresponding to a gesture type is executed based on an operation status of the electronic apparatus and information regarding the gesture type, and wherein the processor may be further configured to execute the at least one instruction to: identify the operation status of the electronic apparatus and whether the function corresponding to the gesture type of the target object is executed during the operation status, and execute the function based on a result of the identification.

The processor may be further configured execute the at least one instruction to execute a function corresponding to gesture information of the target object only when the gesture of the target object is the first gesture type that induces entry into the second operation status during the first operation status.

The processor may be further configured execute the at least one instruction to, based on a gesture type of the target object corresponding to a second gesture type pointing in a predetermined direction during the second operation status, execute a function corresponding to gesture information of the target object when an engagement of the target object is less than a predetermined engagement.

The processor may be further configured execute the at least one instruction to not execute a function corresponding to gesture information of the target object during the third operation status.

In accordance with an aspect of the disclosure, a method of controlling an electronic apparatus, the controlling method includes: obtaining an image; detecting at least one object included in the obtained image; identifying information on an engagement of each of the at least one object with the electronic apparatus; obtaining gesture information of each of the at least one object; obtaining a target object from among the at least one object based on an operation status of the electronic apparatus, the information on the engagement of each of the at least one object, and the obtained gesture information of each of the at least one object; identifying a function corresponding to gesture information of the target object; and executing the identified function.

The identifying information on the engagement of each of the at least one object may include identifying the information on the engagement based on at least one of a distance from the electronic apparatus to each of the at least one object, an angle at which each of the at least one object gazes at the electronic apparatus, a time at which each of the at least one object gazes at the electronic apparatus, and direction information regarding a body and head of each of the at least one object.

The obtaining gesture information may include obtaining gesture information of each of the at least one object based on an image obtained during a plurality of frames, and the identifying information on the engagement of each of the at least one object may include obtaining an average value and a variance value of the angle at which each of the at least one object, obtained during the plurality of frames, gazes at the electronic apparatus, and identifying the information on the engagement of each of the at least one object based on the average value and the variance value.

The obtaining a target object may include obtaining candidate objects having an engagement greater than a predetermined engagement from the at least one object, and identifying, from among the candidate objects, a candidate object making a gesture corresponding to a predetermined gesture as the target object.

The obtaining the target object may include obtaining candidate objects having an engagement greater that predetermined engagement from the at least one object, and identifying, from among the candidate objects, a candidate object at a shortest distance from the electronic apparatus as the target object.

An operation status of the electronic apparatus may include a first operation status in which an input of a wake-up gesture is awaited, a second operation status in which interaction with an object is performed, and a third operation status in which interaction with an object is blocked, wherein the identifying the function may include: storing information indicating whether a function corresponding to a gesture type is executed based on an operation status of the electronic apparatus and information regarding the gesture type; identifying the operation status of the electronic apparatus and whether the function corresponding to the gesture type of the target object is executed during the operation status; and executing the function based on a result of the identification.

The executing the function may include executing a function corresponding to gesture information of the target object only when the gesture of the target object is the first gesture type that induces entry into the second operation status during the first operation status.

The executing the function may include, based on a gesture type of the target object corresponding to the second gesture type pointing in a predetermined direction during the second operation status, executing a function corresponding to gesture information of the target object when an engagement of the target object is less than a predetermined engagement.

A function corresponding to gesture information of the target object may not executed during the third operation status.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 is a table indicating whether a function of an electronic apparatus is executed according to an embodiment;

DETAILED DESCRIPTION

Figure 1:
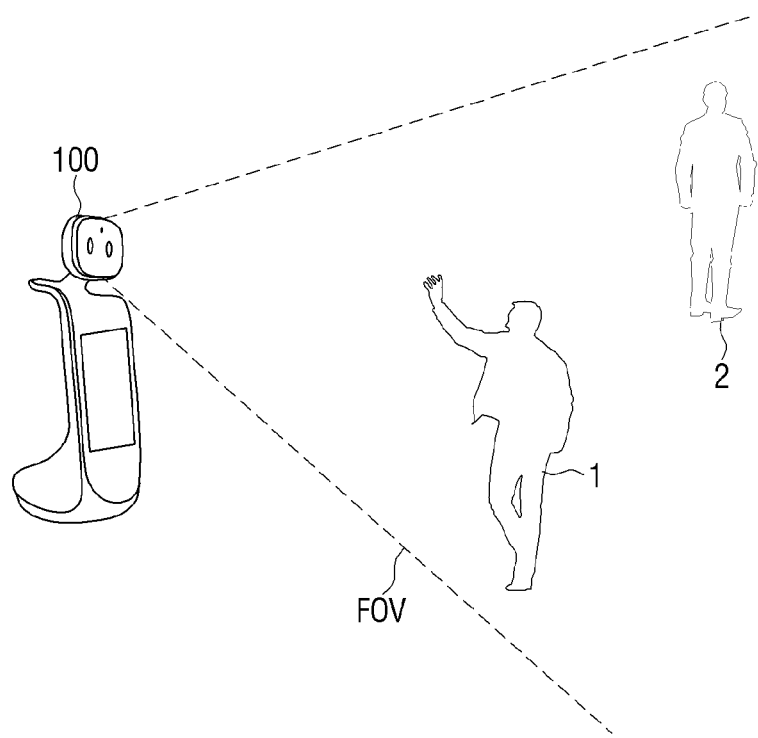
FIG. 1 is an environmental view of an electronic apparatus according to an embodiment.

The terms used in the present disclosure will be descried briefly, and the present disclosure will be described in detail.

General terms that are currently widely used are selected as terms used in embodiments of the disclosure in consideration of functions in the disclosure, but may be changed depending on the intention of those skilled in the art or a judicial precedent, the emergence of a new technique and the like. In addition, in a specific case, terms arbitrarily chosen by an Applicant may exist. In this case, the meanings of such terms are mentioned in detail in corresponding description portions of the disclosure. Therefore, the terms used in the embodiments of the disclosure need to be defined on the basis of the meanings of the terms and the contents throughout the disclosure rather than simple names of the terms.

The disclosure may be variously modified and have several embodiments, and thus specific embodiments of the disclosure are shown in the drawings and described in detail in the detailed description. However, the disclosure is not limited to specific embodiments, but includes all modifications, equivalents and substitutions without departing from the scope and spirit of the disclosure. If it is decided that a detailed description for the known art related to the disclosure may obscure the gist of the disclosure, the detailed description is omitted.

Terms 'first', 'second' and the like, may be used to describe various components, but the components are not to be construed as being limited by the terms. The terms are used only to distinguish one component from another component.

Singular forms used herein are intended to include plural forms unless explicitly indicated otherwise. The terms 'comprise' or 'include' used in the specification, specify the presence of features, numerals, steps, operations, components, parts mentioned in the present specification or combinations thereof, but do not preclude the presence or addition of one or more other features, numerals, steps, operations, components, parts or combinations thereof.

Although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

Hereinafter, embodiments of the disclosure are described in detail with reference to the accompanying drawings so that those skilled in the art to which the present disclosure pertains may easily practice the disclosure. However, the disclosure may be implemented in various different forms and is not limited to the embodiments described herein. In addition, in the drawings, portions unrelated to the description are omitted to obviously describe the disclosure, and similar portions are denoted by similar reference numerals throughout the specification. The relative size and depiction of these elements are not necessarily to scale and may be exaggerated for clarity, illustration, and convenience.

FIG. 1 shows an electronic apparatus according to an embodiment. Specifically, FIG. 1 shows a situation in which there are a plurality of objects in a Field of View (FOV) of an electronic apparatus 100.

In the situation of FIG. 1, a related art gesture recognition apparatus, when recognizing a gesture of a second object 2 that is a non-user while performing an interaction with a first object 1 that is a user, stops the interaction with the first object 1 and executes a function corresponding to the gesture of the second object 2. Accordingly, user convenience and satisfaction is deteriorated.

The electronic apparatus 100 according to an example embodiment may detect the first object 1 and the second object 2, and obtain gesture information and engagement regarding each of the first object 1 and the second object 2. Here, the engagement means a value indicating the degree to which an object is engaged in an electronic apparatus. For example, the engagement may be obtained based on whether an object is gazing at the electronic apparatus.

The electronic apparatus 100 may obtain a target object based on at least one of the obtained gesture information, engagement, or operation status of the electronic apparatus 100, and may identify a function corresponding to the gesture information of the target object. For example, the electronic apparatus 100 may obtain the first object 1 as a target object based on the obtained engagement. Specifically, if the engagement of the first object 1 is greater than predetermined engagement, the electronic apparatus 100 may obtain the first object 1 as the target object. In this case, the electronic apparatus 100 may obtain gesture information of the first object 1, and perform an interaction with the first object 1 based on the obtained gesture information. For example, the electronic apparatus 100 may execute a function corresponding to the gesture information of the first object 1. In addition, even if gesture information of the second object 2 is obtained while performing an interaction with the first object 1, the electronic apparatus 100 may not execute a function corresponding to the gesture information of the second object 2. Alternatively, if the first object 1 is obtained as the target object, the electronic apparatus 100 may not obtain the gesture information of the second object 2. In other words, the electronic apparatus 100 may perform the interaction with the first object 1 continuously. Accordingly, user convenience and satisfaction can be improved.

According to another embodiment, the electronic apparatus 100 may obtain a target object based on obtained gesture information and engagement. For example, if the first object 1 makes a wake-up gesture and has engagement greater than predetermined engagement, the electronic apparatus 100 may obtain the first object 1 as the target object.

According to another embodiment, the electronic apparatus 100 may obtain a target object based on the operation status of the electronic apparatus 100. For example, the electronic apparatus 100 may obtain the first object 1 as the target object while performing an interaction with the first object 1. In this case, even if the second object 2 has engagement greater than predetermined engagement and makes a wake-up gesture, the electronic apparatus 100 may not obtain the second object 2 as the target object.

The electronic apparatus 100 may perform a function corresponding to gesture information of an object based on the operation status of the electronic apparatus 100 and the gesture type of the object. For example, if the electronic apparatus 100 is in a standby status waiting for a user's wake-up gesture and the first object 1 makes a pointing gesture that does not correspond to the wake-up gesture, the electronic apparatus 100 may not perform a function corresponding to the pointing gesture even if the engagement of the first object 1 is greater than predetermined engagement. This is because if the electronic apparatus 100 reacts to a gesture other than the wake-up gesture in the standby status and executes a function corresponding to the gesture, the user may be inconvenienced since the function that is not intended by the user is executed.

As such, the electronic apparatus 100 may execute a function corresponding to a gesture of an object based on not only the engagement of the object but also the operation status of the electronic apparatus 100 and the gesture type. Accordingly, the user convenience and satisfaction can be improved.

In the above, the operation of an electronic apparatus according to an embodiment has been described. However, this is only an example, and other embodiments of the electronic apparatus will be described later.

Figure 2:
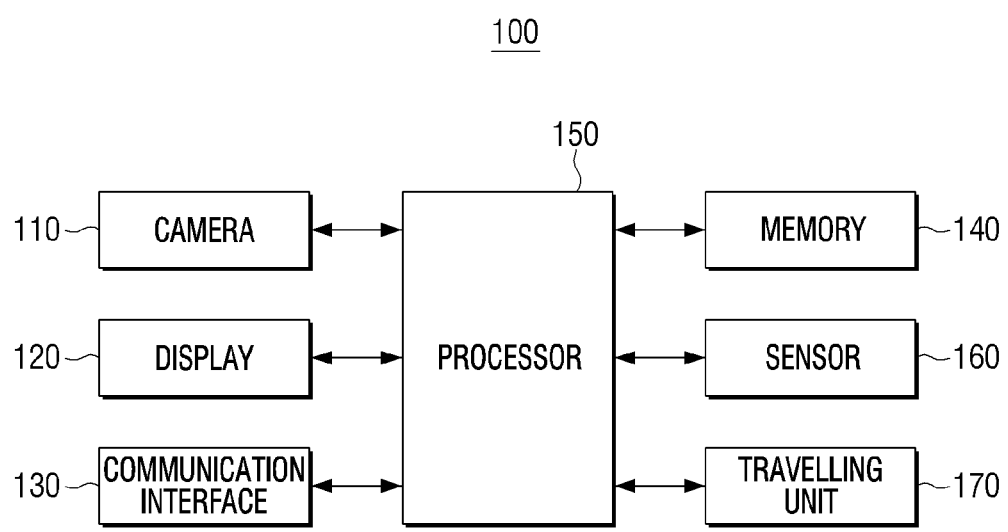
FIG. 2 is a block diagram showing a configuration of an electronic apparatus according to an embodiment.

FIG. 2 is a block diagram illustrating a configuration of an electronic apparatus according to an embodiment. In particular, the electronic apparatus 100 may be a movable robot, and as illustrated in FIG. 2, may include a camera 110, a display 120, a communication interface 130, a memory 140, a processor 150, a sensor 160, and a travelling unit 170. The electronic apparatus 100 does not necessarily have to include all of the above components, and some of the components may be omitted or implemented.

The camera 110 may obtain an image by photographing the surroundings of the electronic apparatus 100. In addition, the camera 110 may be various types of cameras. For example, the camera 110 may be one of a 2D-based red-green-blue (RGB) camera or an infrared (IR) camera. Alternatively, the camera 110 may be one of a 3D-based Time of Flight (ToF) camera or a stereo camera.

The display 120 may display various images. For example, if the electronic apparatus 100 is a retail robot, the display 120 may display information regarding a product provided in a space in which the electronic apparatus 100 exists. However, this is only an example, and the display 120 may display various images such as an image that requires a user's input, a feedback regarding a user input, etc. The display 120 may be a touch screen. In this case, the processor 150 may obtain a user's touch input through the display 120.

The communication interface 130 may include at least one circuit, and may perform communication with various types of external devices. For example, the communication interface 130 may perform communication with an external server or a user terminal. In addition, the communication interface 130 may perform communication with an external device using various types of communication methods. The communication interface 130 may perform data communication wirelessly or via a cable. When the communication interface 130 performs communication with an external device through a wireless communication method, the communication interface 130 may include at least one of a WiFi communication module, a cellular communication module, a 3G (3rd generation) mobile communication module, a 4G (4th generation) mobile communication module, a 4G Long Term Evolution (LTE) communication module, or a 5G (5$^{th}$ generation) mobile communication module. The communication interface 130 may be implemented as a wired communication module (e.g., LAN, etc.).

The memory 140 may store an operating system (OS) for controlling the overall operations of the components of the electronic apparatus 100 and instructions of data related to the components of the electronic apparatus 100. To this end, the memory 140 may be implemented as a non-volatile memory (e.g., hard disk, Solid status drive (SSD), or flash memory), a volatile memory, etc.

For example, the memory 140 may store an instruction that, when an image is obtained from the camera 110, causes the processor 150 to obtain gesture information regarding an object included in the image. In addition, the memory 140 may store a neural model for recognizing a gesture of an object. In particular, the neural network model may be executed by an existing general-purpose processor (e.g., CPU) or a separate AI-only processor (e.g., GUP, NPU, etc.).

The processor 150 may control the overall operations of the electronic apparatus 100. For example, the processor 150 may detect at least one object included in an image captured by the camera 110. In addition, the processor 150 may obtain and identify information on engagement of at least one object regarding the electronic apparatus 100.

The processor 150 may obtain information on engagement based on at least one of the distance from the electronic apparatus 100 to the object, the angle at which the object gazes at the electronic apparatus 100, or direction information of the body and head of the object.

In addition, the processor 150 may obtain gesture information of an object based on an image obtained by the camera 100 during a plurality of frames. In this case, the processor 150 may obtain an average value and a variance value of an angle at which the object obtained during a plurality of frames gazes at the electronic apparatus 100. Further, the processor 150 may obtain the engagement of the object based on the obtained average value and variance value. For example, if the obtained average value is less than a predetermined average value, and the obtained variance value is less than a predetermined variance value, the processor 150 may identify that the object is engaged in the electronic apparatus 100.

The processor 150 may obtain one of at least one object as a target object based on the operation status of the electronic apparatus 100, information on engagement of the object, and obtained gesture information.

The processor 150 may obtain candidate objects that are identified as engaged in the electronic apparatus 100 from among at least one object, and obtain a candidate object that makes a gesture corresponding to a predetermined gesture from among the candidate objects as a target object.

In addition, the processor 150 may obtain a candidate object located at the closest distance from the electronic apparatus 100 out of the candidate objects identified as engaged in the electronic apparatus 100 as a target object.

The processor 150 may identify a function corresponding to gesture information of a target object. In this case, the processor 150 may identify a function corresponding to gesture information of a target object based on the operation status of the electronic apparatus 100, information on engagement of the object, and obtained gesture information. The processor 150 may execute the identified function.

The memory 140 may match and store the operation status of the electronic apparatus 100, information regarding a gesture type, and whether a function corresponding to the gesture type is executed. In this case, the processor 150 may identify the operation status of the electronic apparatus 100 and whether a function corresponding to the gesture type of the target object is executed during the operation status.

The operation status of the electronic apparatus 100 may include a first operation status in which the electronic apparatus 100 waits for an input of a wake-up gesture. In other words, the first operation status may be a standby status.

In addition, the operation status of the electronic apparatus 100 may include a second operation status in which the electronic apparatus 100 performs an interaction with an object. In this case, the second operation status may include a user command status in which the electronic apparatus 100 performs an interaction with an object in response to a command of the object, such as a user. For example, the user command status may include a status in which the electronic apparatus 100 provides information regarding a product to a user through the display 120 in response to the user's product guide command. According to another embodiment, the user command status may include a status in which the electronic apparatus 100 moves toward the user in response to the user's call command. According to yet another embodiment, the user command status may include a status in which the electronic apparatus 100 guides the user to a route in response to the user's route guide command. However, the present disclosure is not limited to the above-described embodiments, and may include a status in which the electronic apparatus 100 performs an interaction with a user in response to the user's various commands.

In addition, the second operation status may include an active trigger status in which the electronic apparatus 100 performs an interaction with an object regardless of a command of the object. For example, the active trigger status may include a status in which the electronic apparatus 100 approaches and greets a user.

Further, the operation status of the electronic apparatus 100 may include a third operation status in which an interaction with an object is blocked. For example, the third operation status may include a status in which the electronic apparatus returns to a charging station for charging and a status in which the electronic apparatus 100 moves to a predetermined place in an emergency situation such as a fire.

The processor 150 may execute a function corresponding to gesture information of the target object only when the gesture type of the target object in the first operation status corresponds to the first gesture type that induces entry into the second operation status. Here, the first gesture type may mean a wake-up gesture. Accordingly, when the processor 150 obtains gesture information of the target object corresponding to the first gesture type in the first operation status, the electronic apparatus 100 may enter the second operation status from the first operation status.

In addition, when the gesture type of the target object in the second operation status corresponds to a second gesture type pointing in a predetermined direction, the processor 150 may execute a function corresponding to the gesture information of the target object even if the engagement of the target object is less than predetermined engagement. This is because, when the target object gives a command to the electronic apparatus 100 through the pointing gesture by pointing in a predetermined direction, the target object may not gaze at the electronic apparatus 100. In addition, the processor 150 may not execute a function corresponding to the gesture information of the target object in the third operation status.

The sensor 160 may be configured to detect information regarding the surrounding environment of the electronic apparatus 100. In particular, the sensor 160 may include a proximity sensor for detecting an approach by a user or an object, a gyro sensor for obtaining motion information, an acceleration sensor, etc. The sensor 160 may include a sensor for obtaining biometric information of a user, and a sensor for obtaining information (e.g., temperature, humidity, etc.) regarding an environment where the electronic apparatus 100 is located.

The travelling unit 170 may be configured to move the electronic apparatus 100. In particular, the travelling unit 170 may include an actuator for driving the electronic apparatus 100. In addition, other than the travelling unit 170, an actuator for driving the motion of other physical components (e.g., an arm, etc.) of the electronic apparatus 100 may be included. For example, the electronic apparatus 100 may control an actuator to travel or move in the direction of a sensed user through the sensor 160.

Hereinafter, an operation of the electronic apparatus 100 will be described with reference to FIG. 3.

Figure 3:
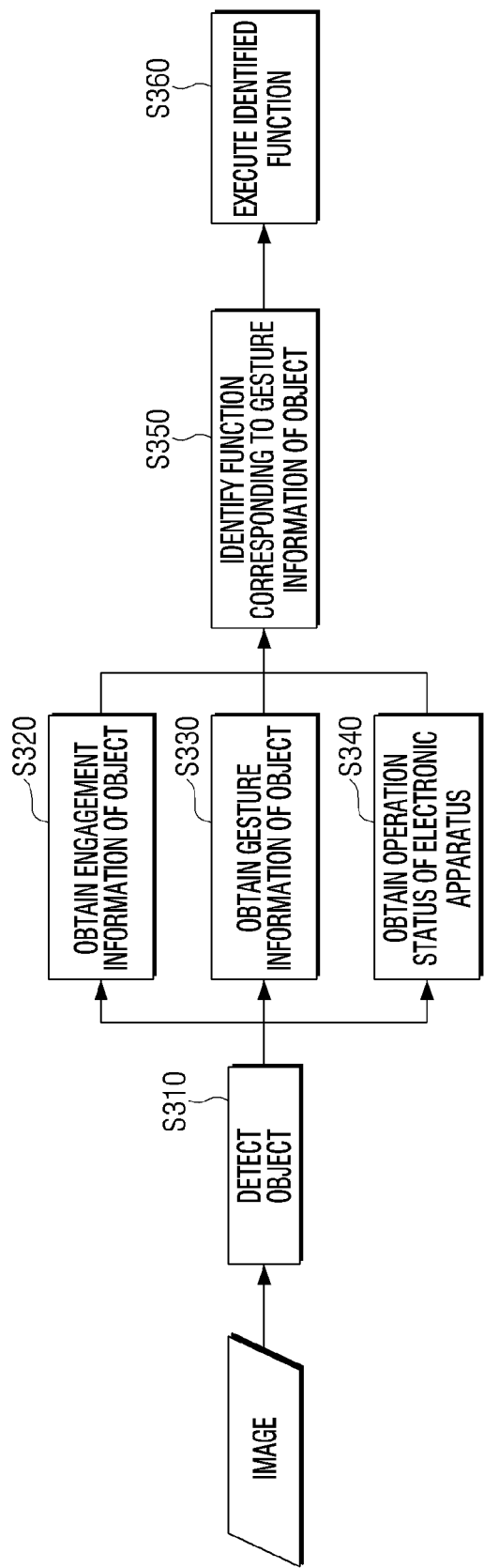
FIG. 3 is a flowchart showing an operation of an electronic apparatus according to an embodiment.

FIG. 3 is a flowchart showing an operation of an electronic apparatus according to an embodiment.

Referring to FIG. 3, the electronic apparatus 100 may obtain an image. For example, the electronic apparatus 100 may obtain an image which is captured by the camera 110 for a plurality of frames.

In addition, the electronic apparatus 100 may detect at least one object included in the obtained image (operation S310). In this case, the electronic apparatus 100 may detect or recognize at least one object by inputting the obtained image to a neural network model that is trained to detect or recognize an object included in an image.

Further, the electronic apparatus 100 may obtain engagement information of an object (operation S320). In this case, the electronic apparatus 100 may obtain or identify the engagement of the object detected in operation S310 regarding the electronic apparatus 100. The detailed description regarding how to obtain engagement information will be described later with reference to FIG. 4.

The electronic apparatus 100 may obtain gesture information of an object (operation S330). In this case, the electronic apparatus 100 may obtain gesture information of the object detected in operation S310. The gesture information of an object may include various types of gestures. For example, the gesture information may include the first gesture type that is a wake-up gesture and the second gesture type that is a pointing gesture pointing in a predetermined direction. In addition, the gesture information may include the third gesture type indicating the status or emotion of an object, such as a user. In this case, the third gesture type may be an expressive gesture. For example, the expressive gesture may include a gesture in which a user requests a high-five or handshake from the electronic apparatus 100. In addition, the gesture information may include the fourth gesture type that is a symbolic gesture. Examples of the fourth gesture type include a gesture for describing the shape or size of an object by a user's hand, a gesture for indicating a number with a finger, and a gesture for indicating a language such as a sign language.

The electronic apparatus 100 may obtain gesture information using a neural network model. For example, the electronic apparatus 100 may obtain gesture information of an object included in an obtained image by inputting the obtained image to a neural network model which is trained to obtain gesture information of an object included in an image. In this case, the electronic apparatus 100 may obtain gesture information of the object by inputting multi-frame images captured continuously at a predetermined time interval to the neural network model. In addition, the electronic apparatus 100 may obtain gesture information of the object using an object detection and object tracking algorithm.

The electronic apparatus 100 may obtain the operation status of the electronic apparatus 100 (operation S340). In this case, the electronic apparatus 100 may obtain the operation status in various ways. For example, the electronic apparatus 100 may obtain the operation status stored in the memory 140. In addition, the electronic apparatus 100 may obtain behavior information including a behavior pattern by analyzing the behavior of the object. In this case, the electronic apparatus 100 may identify the operation status of the electronic apparatus 100 based on the behavior information of the object. For example, when the electronic apparatus 100 obtains the first behavior information where a detected object approaches the electronic apparatus 100, the electronic apparatus 100 may predict that the operation status of the electronic apparatus 100 is an active trigger status.

The electronic apparatus 100 may obtain a target object from multiple objects based on at least one of information on engagement of the object, gesture information and the operation status of the electronic apparatus 100 obtained in operations S320, S330 and S340, respectively. For example, the electronic apparatus 100 may obtain a target object based on information regarding engagement of the object and gesture information. In this case, the electronic apparatus 100 may obtain an object taking a wake-up gesture with engagement greater than predetermined engagement from among at least one object as a target object. According to another embodiment, the electronic apparatus 100 may obtain a target object based on the gesture information of the object and the operation status of the electronic apparatus 100. In this case, the electronic apparatus 100 may obtain an object taking a gesture corresponding to the second gesture type in the second operation status from among at least one object as a target object.

The electronic apparatus 100 may identify a function corresponding to the gesture information of the object (operation S350). Specifically, the electronic apparatus 100 may identify a function corresponding to the gesture information of the target object. In addition, the electronic apparatus 100 may execute the identified function (S360).

Hereinafter, an operation of obtaining engagement information of an electronic apparatus will be described with reference to FIG. 4.

Figure 4:
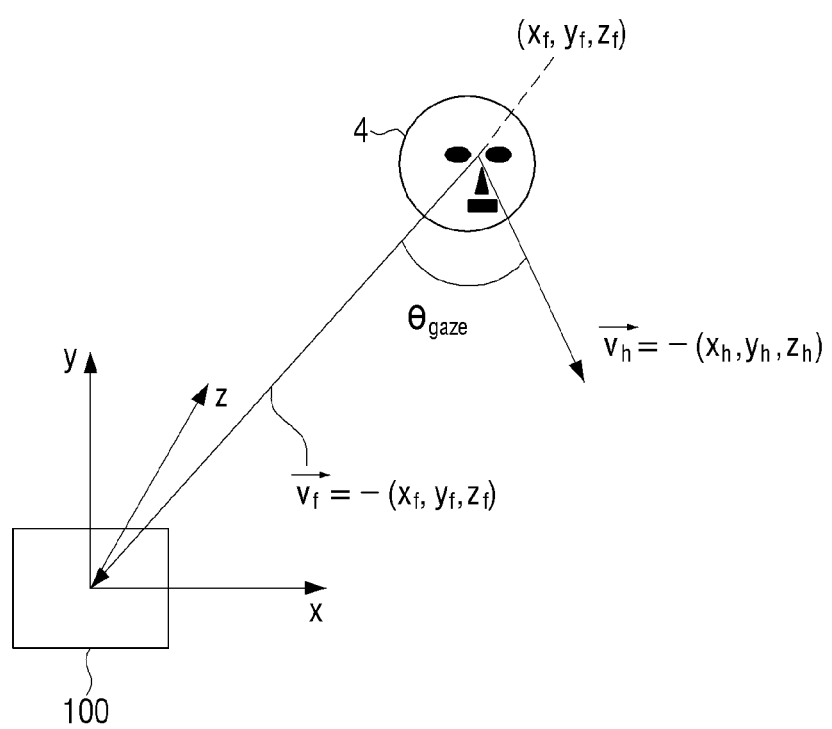
FIG. 4 is a diagram showing an operation of obtaining engagement information of an electronic apparatus according to an embodiment.

FIG. 4 shows an operation of obtaining engagement information of an electronic apparatus according to an embodiment.

Referring to FIG. 4, the electronic apparatus 100 may identify engagement of a user 4 regarding the electronic apparatus 100 based on an angle ($\theta_{gaze}$) at which the user 4 gazes at the electronic apparatus 100. Specifically, the electronic apparatus 100 may obtain a coordinate value ($x_f$, $y_f$, $z_f$) for the center position of the face of the user 4. In this case, the electronic apparatus 100 may obtain the coordinate value ($x_f$, $y_f$, $z_f$) based on depth information included in the image capturing the face of the user 4.

In addition, the electronic apparatus 100 may obtain a gaze angle ($\theta_{gaze}$) based on the following Equation (1).

$$\theta_{gaze} = \cos^{-1} \frac{\vec{v_f} \cdot \vec{v_h}}{\|\vec{v_f}\| \|\vec{v_h}\|} \quad (1)$$

Here $\vec{v_f}=(x_f, y_f, z_f)$, $\vec{v_h}=(x_h, y_h, z_h)$, $\vec{v_f}$ is a vector in the direction of the electronic apparatus from the center of the face of the user 4, and $\vec{v_h}$ is a head pose vector of the user 4.

In addition, the electronic apparatus 100 may identify whether or not the user 4 is engaged, based on the obtained gaze angle ($\theta_{gaze}$) and Equation (2).

$$E_T = \begin{cases} 1, & \text{if } Avg._T(\theta_{gaze}) < th_a \text{ and } Var._T(\theta_{gaze}) < th_v \\ 0, & \text{otherwise} \end{cases} \quad (2)$$

Here $E_T$ is an engagement value, $Avg._T(\theta_{gaze})$ sis the average value of the gaze angle ($\theta_{gaze}$) $th_a$ is a predetermined average value, $Var._T(\theta_{gaze})$ is the variance value of the gaze angle ($\theta_{gaze}$), $th_v$ is a predetermined variance value, and T is a time section where the gesture of the user 4 is recognized.

The electronic apparatus 100 may identify that the user 4 is engaged in the electronic apparatus 100 only when the average value ($Avg._T(\theta_{gaze})$) of the gaze angle ($\theta_{gaze}$) is less than the predetermined average value ($th_a$), and the variance value ($Var._T(\theta_{gaze})$) of the gaze angle ($\theta_{gaze}$) is less than the predetermined variance value ($th_v$) (i.e., $E_T=1$). In other cases, the electronic apparatus 100 may identify that the user 4 is not engaged in the electronic apparatus 100 (i.e., $E_T=0$). In another embodiment, the engagement ($E_T$) may not have a value of 0 or 1, and may have various values. For example, the engagement value of the user 4 may be 0.6, and the predetermined engagement value may be 0.5. In this case, since the engagement value of the user 4 is greater than the predetermined engagement value, the electronic apparatus 100 may identify or determine that the user 4 is engaged in the electronic apparatus 100.

The electronic apparatus 100 may determine engagement based on the gaze angle of a user as described above, but this is only an example. The electronic apparatus 100 may identify or determine the engagement of the user 4 in various ways. According to another embodiment, the electronic apparatus 100 may identify the engagement of the user 4 based on the time during which the user 4 gazes at the electronic apparatus 100. For example, if the time during which the user 4 gazes at the electronic apparatus 100 is greater than a predetermined time, the electronic apparatus 100 may identify the engagement value ($E_T$) to be 1. In this case, the electronic apparatus 100 may identify that the user 4 is engaged in the electronic apparatus 100. According to another example embodiment, the electronic apparatus 100 may identify the engagement of the user 4 based on a pose vector of each of the body and face of the user 4. For example, if a difference value between the pose vector of the body of the user 4 and the pose vector of the face of the user 4 is less than a predetermined value, the electronic apparatus 100 may identify the engagement value ($E_T$) to be 1. In this case, the electronic apparatus 100 may identify that the user 4 is engaged in the electronic apparatus 100. In addition, the electronic apparatus 100 may track the eyeball(s) of the user 4 to identify whether the user 4 gazes at the electronic apparatus 100. For example, if the angle between the central axis of the eyeball of the user 4 and the central axis of the FOV of the camera 110 is within a predetermined angle range, the electronic apparatus 100 may identify the engagement value ($E_T$) to be 1.

Hereinafter, a method of obtaining a target object of an electronic apparatus will be described with reference to FIG. 5.

Figure 5:
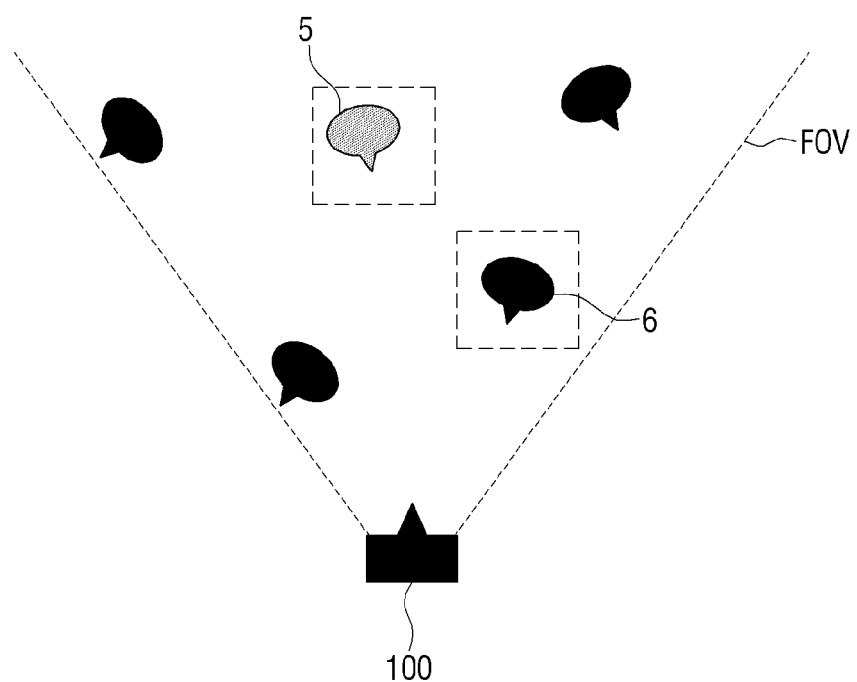
FIG. 5 is a diagram showing an operation of obtaining a target object of an electronic apparatus according to an embodiment.

FIG. 5 shows an operation of obtaining a target object of an electronic apparatus according to an embodiment. Specifically, FIG. 5 is a top view of an electronic apparatus and objects.

As shown in FIG. 5, a plurality of objects may exist in the FOV of the electronic apparatus 100. In this case, the electronic apparatus 100 may obtain information regarding engagement of each of the plurality of objects. In addition, the electronic apparatus 100 may obtain a first candidate object 5 and a second candidate object 6 having an engagement value greater than predetermined engagement value from among the plurality of objects. In this case, the electronic apparatus 100 may obtain the first candidate object 5 that makes a gesture corresponding to a predetermined gesture between the first candidate object 5 and the second candidate object 6 as a target object. The predetermined gesture may be a gesture corresponding to the above-described first gesture type.

The electronic apparatus 100 may obtain a target object based on the operation status of the electronic apparatus 100, gesture information of an object, and information regarding engagement, and execute a function corresponding to the gesture information of the target object.

FIG. 6 is a table showing whether an object is engaged and whether a function of an electronic apparatus is executed according to an embodiment.

As shown in FIG. 6, whether a function of the electronic apparatus is executed may be obtained based on the operation status of an electronic apparatus, the gesture type of an object, information regarding engagement. The data indicating whether a function of the electronic apparatus is executed may be stored in the memory 140 of the electronic apparatus 100.

Hereinafter, the operation of an electronic apparatus according to various cases shown in FIG. 6 will be described.

In the first operation status, the electronic apparatus 100 may execute a function corresponding to the gesture information of the object only when obtaining gesture information corresponding to the first gesture type. In this case, when gesture information of a type other than the first gesture type is obtained, even though it is identified that the object is engaged in the electronic apparatus 100, the electronic apparatus 100 may not execute a function corresponding to the gesture information. In other words, the electronic apparatus 100 may not execute a function corresponding to a gesture other than the wake-up gesture in the first operation status.

Figure 7:
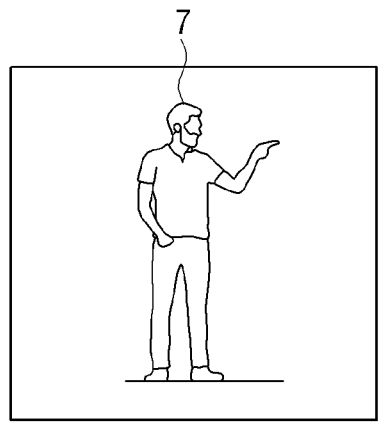
FIG. 7 shows a user being viewed from a perspective of an electronic apparatus according to an embodiment.

FIG. 7 shows a user 7 being viewed from a perspective of the electronic apparatus 100 according to an embodiment. In FIG. 7, the user 7 may make a pointing gesture corresponding to the second gesture type without gazing at the electronic apparatus 100. In this case, if the electronic apparatus is performing an interaction with the user 7, even though the user 7 does not gaze at the electronic apparatus 100, the electronic apparatus 100 may execute a function corresponding to the gesture of the user 7. Accordingly, the user 7 may continue to interact with the electronic apparatus 100.

As such, even if it is identified that the object is not engaged in the electronic apparatus 100, when the gesture information of the object corresponds to the second gesture type, the electronic apparatus 100 may execute a function corresponding to the gesture information of the object. Referring back to FIG. 6, in the second operation status, even though the engagement of the object is less than predetermined engagement, the electronic apparatus 100 may execute a function corresponding to the gesture of the object as long as the gesture of the object corresponds to the second gesture type. That is, in the second operation state, when the gesture of the object is identified as the second gesture type, the electronic device 100 may execute a function corresponding to the gesture of the object irrespective of whether the object is engaged in the electronic apparatus 100. For example, when a user makes a gesture pointing to a specific product with a hand while looking at the specific product, in the second operation state, the electronic device 100 a function corresponding to the user's gesture (for example, a function of providing information on a product indicated by a user) even if the user does not stare at the electronic device 100. Accordingly, user satisfaction and convenience can be improved.

In the active trigger status, if the gesture information of the object corresponds to the third gesture type or the fourth gesture type, the electronic apparatus may not execute a function corresponding to the gesture information of the object even if the engagement of the object is greater that predetermined engagement. For example, if the electronic apparatus 100 performs the operation of greeting a user who approaches the electronic apparatus 100 regardless of a user's command, the electronic apparatus 100 may not perform a function corresponding to the gesture of the user even if the user makes a gesture corresponding to the fourth type, such as a hand gesture indicating a number while gazing at the electronic apparatus 100. This is because the user usually does not make a gesture corresponding to the fourth gesture type when the electronic apparatus 100 is in the active trigger status. In this case, the user may be provided with a function from the electronic apparatus by making a gesture corresponding to the first gesture type such as a wake-up gesture and then, making a gesture corresponding to the third gesture type or the fourth gesture type.

In the third operation status, the electronic apparatus 100 may not execute a function corresponding gestures of all gesture types of the object regardless whether the object is engaged or not. This is because, in the third operation status such as an emergency situation, it may not possible for the electronic apparatus 100 to perform an interaction with a user (e.g., when charging is required), or performing a predetermined operation (e.g., moving to a place for charging) would be more important than performing an interaction with a user.

Hereinafter, the method of identifying an operation status of an electronic apparatus will be described.

Figure 8:
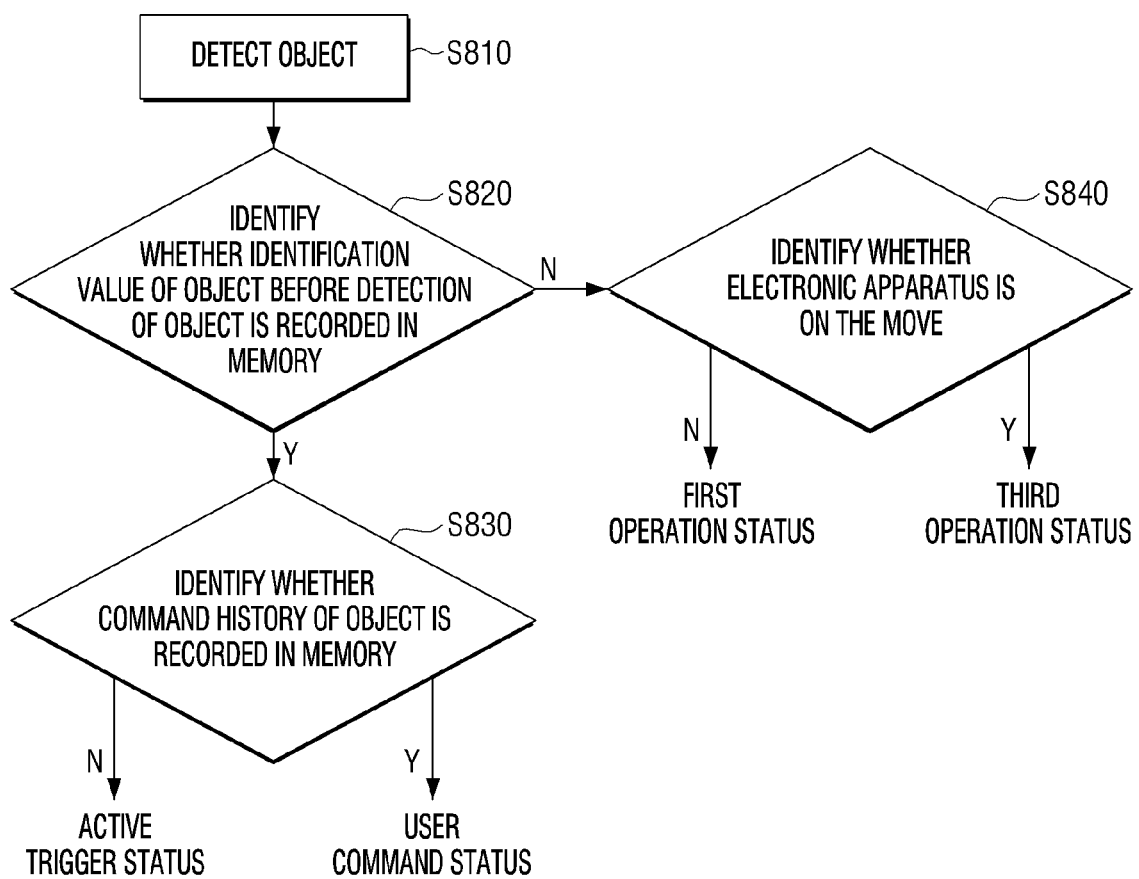
FIG. 8 is a flowchart showing method of identifying an operation status of an electronic apparatus according to an embodiment.

FIG. 8 shows a method of identifying an operation status of an electronic apparatus according to an embodiment. As described above, the electronic apparatus 100 may execute a function corresponding to the gesture information of a target object based on the operation status of the electronic apparatus 100.

Referring to FIG. 8, the electronic apparatus 100 may detect an object (operation S810). When an object is detected, the electronic apparatus 100 may obtain an identification value corresponding to the detected object. The electronic apparatus 100 may store the obtained identification value in the memory 140. This operation may corresponding to operation S310 of FIG. 3 above and thus, description overlapping with FIG. 3 will be omitted.

The electronic apparatus 100 may identify whether the identification value of the detected object is recorded in the memory 140 (operation S820). If the identification value regarding the detected object before the detection of the object is recorded in the memory 140, the electronic apparatus 100 may identify whether the command history of the detected object is recorded in the memory 140 (operation S830). In this case, if the command history of the detected object is recorded in the memory 140, the electronic apparatus 100 may identify that the operation status of the electronic apparatus 100 is the user command status. Alternatively, the command history of the object is not recorded in the memory 140, the electronic apparatus may identify that the operation status of the electronic apparatus 100 is the active trigger status. If the identification value regarding the detected object before the detection of the object is not recorded in the memory 140, the electronic apparatus 100 may identify whether the electronic apparatus 100 is on the move (operation S840). In this case, if the electronic apparatus 100 is on the move, the electronic apparatus 100 may identify that the operation status of the electronic apparatus 100 is the third operation status. If the electronic apparatus 100 is not on the move, the electronic apparatus 100 may identify that the operation status of the electronic apparatus 100 is the first operation status.

As such, based on the identified operation status, the electronic apparatus 100 may execute a function corresponding to the gesture information of the target object.

The operation status of the electronic apparatus 100 may change according to various conditions. For example, when the electronic apparatus 100 in the first operation status obtains a trigger gesture of a user, the electronic apparatus 100 may enter the user command status. In this case, the operation status of the electronic apparatus 100 may be converted from the first operation status to the user command status. If the user's gesture input is not received for a predetermined time, the electronic apparatus 100 in the user command status may enter the first operation status again. In this case, the operation status of the electronic apparatus may be converted from the user command status to the first operation status.

Figure 9:
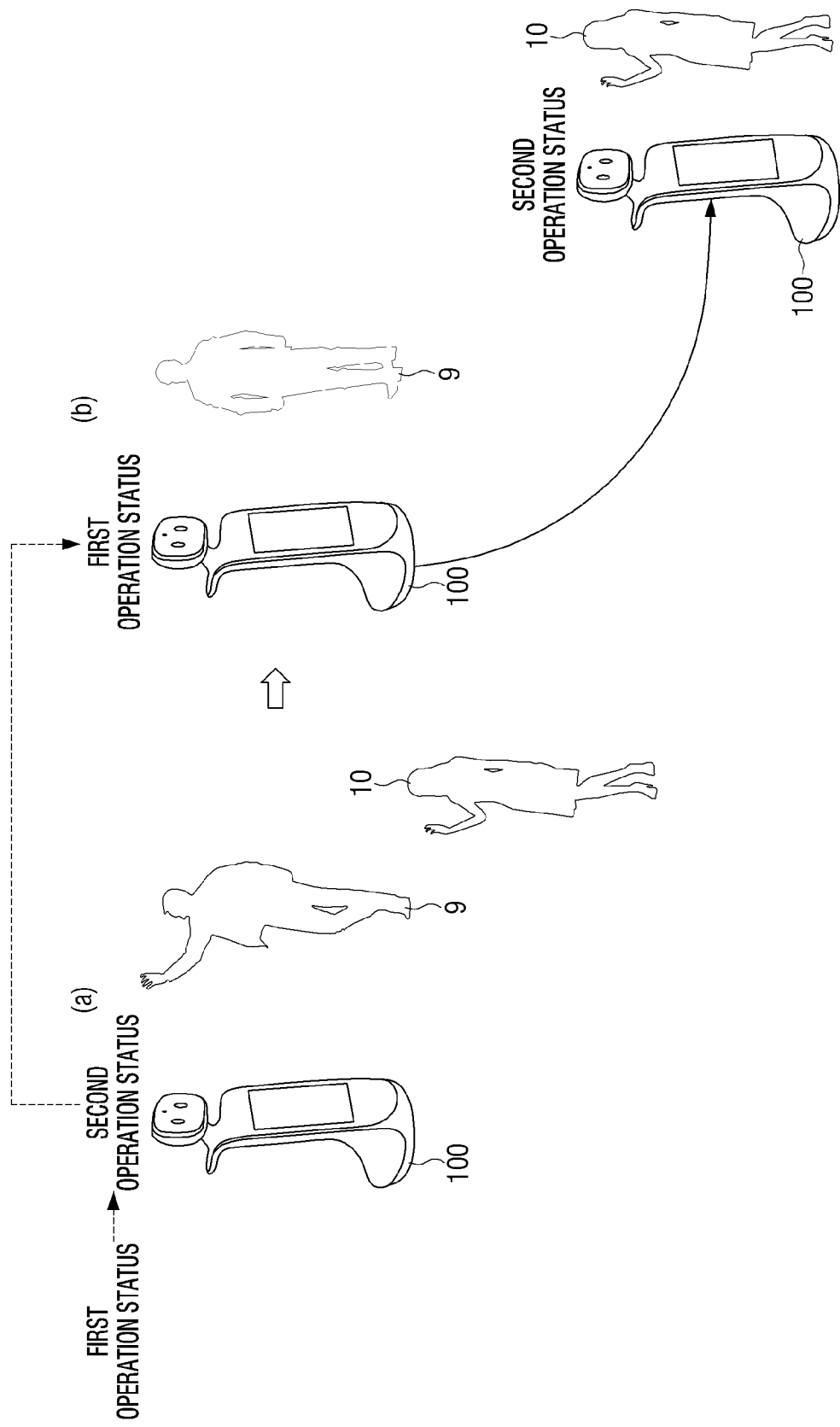
FIG. 9 is a diagram showing an operation of an electronic apparatus according to an embodiment.

FIG. 9 shows an operation of an electronic apparatus according to an embodiment.

Referring to FIG. 9 scenario (a), the electronic apparatus 100 may perform an interaction with at least one of a plurality of users in an environment where the plurality of users exist. For example, the electronic apparatus 100 may perform an interaction with a first user 9. Specifically, when obtaining a wake-up gesture of the first user 9 having engagement greater than predetermined engagement, the electronic apparatus 100 in the first operation status may enter the second operation status. Here, the second operation status may mean the user command status. In this case, the electronic apparatus 100 may obtain the first user 9 as a target object, and perform an interaction with the first user 9 based on an additional gesture of the first user 9. In addition, in the user command status, even if a second user 10 having engagement greater than predetermined engagement within the FOV of the electronic apparatus 100 makes the gesture of calling the electronic apparatus 100, the electronic apparatus 100 may perform an interaction with the first user 9 without executing a function corresponding to the gesture of the second user 10. Therefore, the electronic apparatus 100 may provide the first user 9 who is the target object with a function corresponding to the gesture information of the first user 9 continuously. Accordingly, the satisfaction of the first user 9 can be improved.

Referring to FIG. 9 scenario (b), if a gesture of the first user 9 is not obtained for a predetermined time from the time when the electronic apparatus 100 enters the second operation status, the electronic apparatus may enter the first operation status. If a gesture in which the second user 10 having engagement greater than predetermined engagement calls the electronic apparatus 100 is obtained, the electronic apparatus 100 may obtain the second user 10 as a target object and move near the second user 10.

Figure 10:
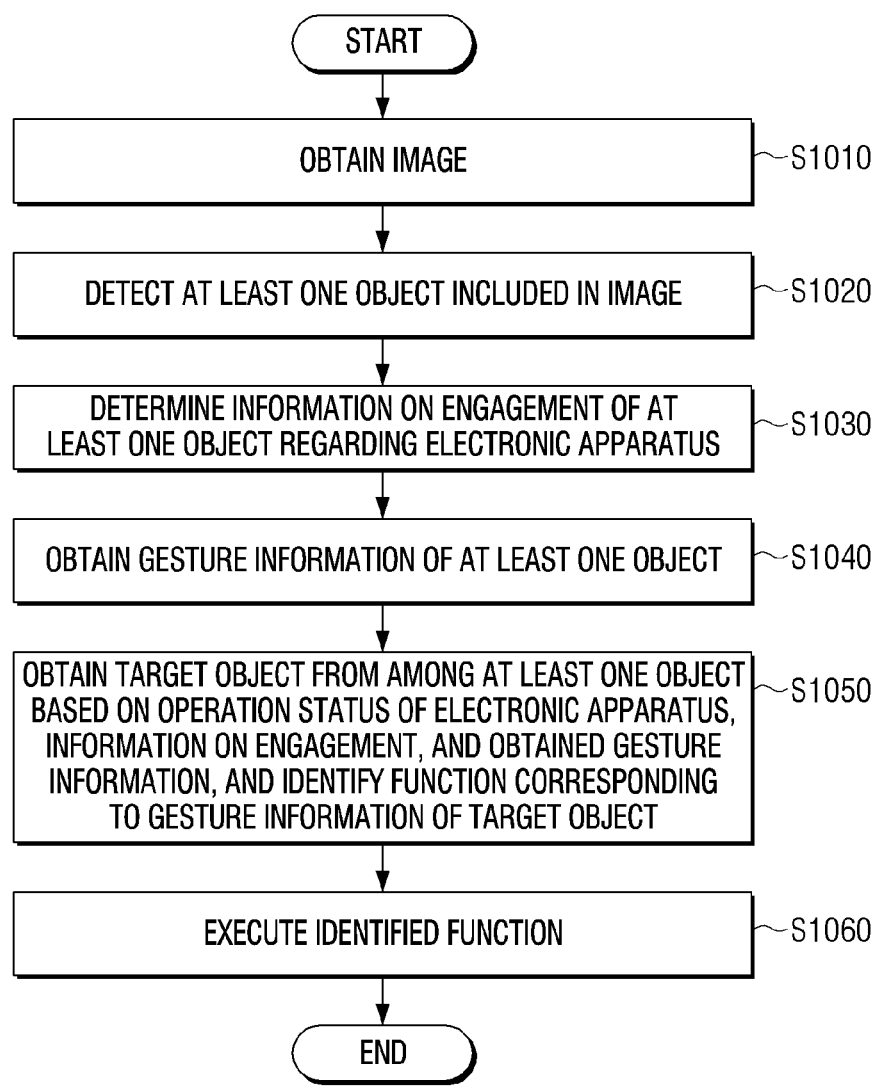
FIG. 10 is a flowchart showing a controlling method of an electronic apparatus according to an embodiment.

FIG. 10 is a flowchart describing a controlling method of an electronic apparatus according to an embodiment.

Referring to FIG. 10, the controlling method may include obtaining an image (operation S1010), detecting at least one object included in the image (operation S1020), determine information on engagement of the at least one object regarding an electronic apparatus (operation S1030), obtaining gesture information of the at least one object (operation S1040), obtaining a target object from among at least one object based on the operation status of the electronic apparatus, the information on engagement, and the obtained gesture information, and identifying a function corresponding to the gesture information of the target object (operation S1050), and executing the identified function (operation S1060).

Hereinafter, each operation will be described.

The electronic apparatus 100 may obtain an image (operation S1010). In this case, the electronic apparatus 100 may obtain an image which captures the periphery of the electronic apparatus 100 by the camera 110.

The electronic apparatus 100 may detect at least one object included in the image (operation S1020). In this case, the electronic apparatus 100 may obtain at least one of position information, type information, or distance information of the object. In addition, the electronic apparatus 100 may obtain an identification value regarding the detected object. This operation may correspond to operation S310 of FIG. 3 described above.

The electronic apparatus 100 may identify information on engagement regarding the electronic apparatus by at least one object (operation S1030). In this case, the electronic apparatus 100 may identify engagement of the at least one object detected at S1010 regarding the electronic apparatus. In addition, the electronic apparatus 100 may determine whether the at least one object is engaged in the electronic apparatus 100 based on the obtained engagement. Operation S1030 may correspond to operation S320 of FIG. 3 described above and thus, overlapping description will be omitted.

In addition, the electronic apparatus 100 may obtain gesture information of the at least one object (operation S1040). In this case, the electronic apparatus 100 may obtain gesture information of an object included in the image by analyzing the obtained image. In addition, the electronic apparatus 100 may obtain images of multiple frames which are captured continuously and obtain gesture information of the object. Operation S1040 may correspond to operation S330 of FIG. 3 described above.

In addition, the electronic apparatus 100 may obtain a target object from among at least one object based on the operation status of the electronic apparatus 100, the information on engagement and the obtained gesture information and identify a function corresponding to the gesture information of the target object (operation S1050). The present operation may be understood by those skilled in the art to correspond to operations S350, S360 of FIG. 3 and FIG. 6 and thus, detailed description thereof will be omitted.

In addition, the electronic apparatus 100 may execute the identified function (operation S1060).

The embodiments described above may be implemented in a computer or an apparatus similar to the computer using software, hardware, or a combination of software and hardware. In some cases, embodiments described in the disclosure may be implemented by a processor itself. According to a software implementation, embodiments such as procedures and functions described in the specification may be implemented by separate software modules. Each of the software modules may perform one or more functions and operations described in the disclosure.

Computer instructions for performing processing operations according to the embodiments described above may be stored in a non-transitory computer-readable medium. The computer instructions stored in the non-transitory computer-readable medium cause a specific device to perform the processing operations of the display apparatus according to the diverse embodiments described above when they are executed by a processor of the specific device.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a ROM, and the like.

While embodiments of the disclosure have been shown and described, the disclosure is not limited to the aforementioned embodiments, and it is apparent that various modifications can be made by those having ordinary skill in the art to which the disclosure belongs, without departing from the gist of the disclosure as claimed by the appended claims, and such modifications are not to be interpreted independently from the technical idea or prospect of the disclosure.

What is claimed is:

1. An electronic apparatus comprising:
a camera;
a memory configured to store at least one instruction; and
at least one processor configured to execute the at least one instruction to:
detect a plurality of objects included in an image captured by the camera;
obtain information on an engagement of the plurality of objects with the electronic apparatus;
obtain gesture information of the plurality of objects;
obtain candidate objects having an engagement greater than a predetermined engagement from among the plurality of objects;
identify, from among the candidate objects, a candidate object making a gesture corresponding to a predetermined gesture as the target object;
identify a function corresponding to gesture information of the target object; and
execute the identified function.

2. The electronic apparatus as claimed in claim 1, wherein the at least one processor is further configured to execute the at least one instruction to obtain the information on the engagement of the plurality of objects based on at least one of a distance from the electronic apparatus to the plurality of objects, an angle at which the plurality of objects gazes at the electronic apparatus, a time at which the plurality of objects gazes at the electronic apparatus, and direction information regarding a body and head of the plurality of objects.

3. The electronic apparatus as claimed in claim 2, wherein the at least one processor is further configured to execute the at least one instruction to:
obtain gesture information of the plurality of objects based on an image obtained during a plurality of frames;
obtain an average value and a variance value of the angle at which the plurality of objects, obtained during the plurality of frames, gazes at the electronic apparatus; and
obtain the information on the engagement of the plurality of objects based on the average value and the variance value.

4. The electronic apparatus as claimed in claim 1, wherein the at least one processor is further configured execute the at least one instruction to:
identify, from among the candidate objects, a candidate object at a shortest distance from the electronic apparatus as the target object.

5. The electronic apparatus as claimed in claim 1, wherein the operation status of the electronic apparatus comprises a first operation status in which an input of a wake-up gesture is awaited, a second operation status in which interaction with an object is performed, and a third operation status in which interaction with the object is blocked,
wherein the memory is configured to store information indicating whether a function corresponding to a gesture type is executed based on the operation status of the electronic apparatus and information regarding the gesture type, and
wherein the at least one processor is further configured to execute the at least one instruction to:
identify at least one operation status of the electronic apparatus and whether the function corresponding to the gesture type of the target object is executed during the operation status, and
execute the function based on a result of the identification of the operation status.

6. The electronic apparatus as claimed in claim 5, wherein the at least one processor is further configured execute the at least one instruction to execute a function corresponding to gesture information of the target object only when the gesture of the target object is a first gesture type that induces entry into the second operation status during the first operation status.

7. The electronic apparatus as claimed in claim 5, wherein the at least one processor is further configured execute the at least one instruction to, based on a gesture type of the target object corresponding to a second gesture type pointing in a predetermined direction during the second operation status, execute a function corresponding to gesture information of the target object when an engagement of the target object is less than a predetermined engagement.

8. The electronic apparatus as claimed in claim 5, wherein the at least one processor is further configured execute the at least one instruction to not execute a function corresponding to gesture information of the target object during the third operation status.

9. A method of controlling an electronic apparatus, the controlling method comprising:
obtaining an image;
detecting a plurality of objects included in the obtained image;
obtaining information on an engagement of the plurality of objects with the electronic apparatus;
obtaining gesture information of the plurality of objects;
obtaining candidate objects having an engagement greater than a predetermined engagement from among the plurality of objects;
identifying, from among the candidate objects, a candidate object making a gesture corresponding to a predetermined gesture as the target object;
identifying a function corresponding to gesture information of the target object; and
executing the identified function.

10. The method as claimed in claim 9, wherein the obtaining information on the engagement of the plurality of objects comprises obtaining the information on the engagement based on at least one of a distance from the electronic apparatus to the plurality of objects, an angle at which the plurality of objects gazes at the electronic apparatus, a time at which the plurality of objects gazes at the electronic apparatus, and direction information regarding a body and head of the plurality of objects.

11. The method as claimed in claim 10, wherein the obtaining gesture information comprises obtaining gesture information of the plurality of objects based on an image obtained during a plurality of frames, and
wherein the obtaining information on the engagement of the plurality of objects comprises obtaining an average value and a variance value of the angle at which each of the plurality of objects, obtained during the plurality of frames, gazes at the electronic apparatus, and obtaining the information on the engagement of each of the plurality of objects based on the average value and the variance value.

12. The method as claimed in claim 9, wherein the obtaining the target object comprises obtaining candidate objects having an engagement greater that predetermined engagement from the plurality of objects, and identifying, from among the candidate objects, a candidate object at a shortest distance from the electronic apparatus as the target object.

13. The method as claimed in claim 9, wherein the operation status of the electronic apparatus comprises a first operation status in which an input of a wake-up gesture is awaited, a second operation status in which interaction with an object is performed, and a third operation status in which interaction with the object is blocked, wherein the identifying the function comprises:

storing information indicating whether a function corresponding to a gesture type is executed based on the operation status of the electronic apparatus and information regarding the gesture type;

identifying the operation status of the electronic apparatus and whether the function corresponding to the gesture type of the target object is executed during the operation status; and executing the function based on a result of the identification of the operation status.

14. The method as claimed in claim 13, wherein the executing the function comprises executing a function corresponding to gesture information of the target object only when the gesture of the target object is a first gesture type that induces entry into the second operation status during the first operation status.

15. The method as claimed in claim 13, wherein the executing the function comprises, based on a gesture type of the target object corresponding to a second gesture type pointing in a predetermined direction during the second operation status, executing a function corresponding to gesture information of the target object when an engagement of the target object is less than a predetermined engagement.

16. The method as claimed in claim 13, wherein a function corresponding to gesture information of the target object is not executed during the third operation status.

\* \* \* \* \*